United States Patent
Pellegrino

(10) Patent No.: US 7,926,189 B1
(45) Date of Patent: Apr. 19, 2011

(54) CUSTOMIZABLE TOOL FOR MOUNTING AN ALIGNMENT INSTRUMENT FOR SPECIFIC BOLT PATTERNS COMBINED WITH A DIRECT MOUNT CLAMPLESS HUB ADAPTER

(76) Inventor: Dean Pellegrino, Thousand Oaks, CA (US)

(*) Notice: Subject to any disclaimer, the term of this patent is extended or adjusted under 35 U.S.C. 154(b) by 0 days.

(21) Appl. No.: 12/658,495

(22) Filed: Feb. 8, 2010

Related U.S. Application Data

(60) Provisional application No. 61/207,672, filed on Feb. 11, 2009.

(51) Int. Cl.
*G01B 5/255* (2006.01)
(52) U.S. Cl. .................................................. 33/203.18
(58) Field of Classification Search ............... 33/203, 33/203.18
See application file for complete search history.

(56) References Cited

U.S. PATENT DOCUMENTS

| | | | | |
|---|---|---|---|---|
| 5,174,032 A * | 12/1992 | Beck | | 33/203 |
| 6,138,366 A * | 10/2000 | Boess | | 33/203.18 |
| 6,507,988 B1 * | 1/2003 | Riviere | | 33/203.18 |
| 6,622,389 B1 * | 9/2003 | Pellegrino | | 33/203.18 |
| RE40,214 E * | 4/2008 | Pellegrino | | 33/203.18 |
| 7,353,610 B2 * | 4/2008 | Gerdes et al. | | 33/203 |
| 7,478,482 B1 | 1/2009 | Pellegrino | | |
| 7,578,066 B1 | 8/2009 | Pellegrino | | |
| 2003/0159298 A1 * | 8/2003 | Mieling | | 33/203.15 |
| 2006/0096109 A1 * | 5/2006 | Corghi | | 33/203.18 |

* cited by examiner

*Primary Examiner* — G. Bradley Bennett
(74) *Attorney, Agent, or Firm* — Sandy Lipkin

(57) ABSTRACT

An all-in-one hand tool for the alignment of a vehicle wheel with predetermined lug bolt/nut patterns for specific manufacturers. The tool has pre-formed adapters that protrude from one side of the hand-held plate that attach to specific lug nut/bolt patterns on vehicle wheels. The other side of the hand-held plate allows for an alignment instrument to slide thereon. The instrument is highly accurate as it is pre-welded and does not need to be adjusted to the wheel. The plate is not clamped on to the wheel allowing for preservation of wheel covers and greater accuracy.

6 Claims, 6 Drawing Sheets

CUSTOMIZABLE TOOL FOR MOUNTING AN ALIGNMENT INSTRUMENT FOR SPECIFIC BOLT PATTERNS COMBINED WITH A DIRECT MOUNT CLAMPLESS HUB ADAPTER

REFERENCE TO PRIOR APPLICATION

This application claims the priority of provisional application 61/207,672, filed Feb. 11, 2009 entitled CUSTOMIZABLE TOOL FOR MOUNTING AN ALIGNMENT INSTRUMENT FOR SPECIFIC BOLT PATTERNS COMBINED WITH A DIRECT MOUNT CLAMPLESS ADAPTER by Dean Pellegrino.

BACKGROUND OF THE INVENTION

1. Field of the Invention

The field of this invention relates generally to wheel alignment tools and specifically toward a streamlined hand-held tool that allows for quick attachment of an alignment tool to a wheel without clamps and with greater accuracy.

2. Description of the Prior Art

The field of this invention relates to a system for mounting of an alignment instrument precisely on a vehicular wheel in order to align that wheel where the alignment instrument does not in and of itself touch the vehicular wheel. The system utilizes a tool that is customizable to specific wheels manufactured by specific auto manufacturers with specific bolt patterns.

Proper alignment of vehicle wheels is necessary for smooth, vibration-free handling of the vehicle and also so the vehicle doesn't have a tendency to drift one way or another on the road. Also, proper alignment of vehicle wheels is a necessary component for even tire wear. To accomplish vehicular alignment, it is necessary to establish the position of certain measurements in conjunction with each vehicle wheel. These measurements are camber, caster, steering axis, inclination and toe.

Typical present day alignment instruments utilize placing a separate vehicular instrument (sensor) on each vehicular wheel. Each instrument has an emitter and a receiver. The emitter emits a signal which is transmitted to a receiver of another alignment instrument. The receiver will convert the signal into a value which is indicative of the corresponding alignment angle of the vehicle. This information can be used by the mechanic to adjust the aforementioned measurements in order to achieve the correct and necessary alignment for a vehicular wheel.

Alignment instruments that are in present day usage are normally mounted onto the entire rim of the vehicular wheel. Tire rims sometimes may be damaged and may be slightly out of round or slightly inclined relative to the wheel hub. Such damage frequently occurs by the tire and the rim coming into hard contact with an uneven roadway, such as a chuckhole or a curb. Using of the alignment instrument in conjunction with the tire rim does not achieve an accurate alignment because the rim itself is not correctly aligned relative to the wheel hub on which it is mounted.

Additionally, a great many tire rims are designed to be ornate and have a highly polished chrome surface. Mounting of an alignment instrument on such a vehicular rim frequently causes scratching or denting of the rim. Vehicle owners of such rims take great pride in the appearance of these rims. When a vehicle owner has left his vehicle with a mechanic or tire shop, and when he or she comes back to pick up his or her vehicle finds scratches or dents on the rims, almost invariably the vehicle owner will insist upon replacement, not repair, of these rims. Replacement of each rim can run several hundred dollars in cost to the mechanic or tire shop.

Additionally, most tire rims, in years past, have been manufactured with an annular raised lip located directly adjacent and peripheral edge of the tire rim. The alignment instruments have been constructed to utilize the annular raised lip to mount the instrument onto the tire rim. Currently, some tire rims no longer are being manufactured with this annular raised lip. Therefore, there is no known way to mount the alignment instrument onto the tire rim. The result is the mechanic doing the alignment just does a lot of "fudging" or "speculating" and guesses at what he or she hopes will be a correct alignment. The result is the alignment is of poor quality and proper handling of the vehicle is not obtained. Uneven tire wear is also obtained.

The field of this invention relates generally to wheel alignment tools and specifically toward an adapter that allows for accurate alignment of wheels without the direct clamping of the alignment head to the wheel and that incorporates a handle and head that incorporates specific bolt patterns found on specific wheels made by specific auto manufacturers. The subject matter of the present invention is an improved adapter for wheel alignment that is particularly helpful with new generation tires that contain newer technology, including lipless wheels, rim-guard tires, stiffer sidewalls and larger diameter wheels.

SUMMARY OF THE INVENTION

The basic embodiment of the present invention teaches a mounting system adapted to mount an alignment instrument on a vehicle wheel which is fixedly mounted on a wheel hub assembly a series of spaced apart lug bolts or nuts that protrude outward from the wheel hub assembly. The mounting system includes a hand-held mounting plate that includes specific holes for specific bolt patterns manufactured by specific auto manufacturers. The handheld mounting plates have a series of hole patterns designed to fit specific series of bolt patterns for specific wheels manufactured by specific auto manufacturers. Bolt patterns or bolt circles are defined as the diameter of an imaginary circle formed by the centers of the wheel lugs. Bolt patterns can be 4, 5, 6 or 8 lug holes. A bolt circle of 4×3.93 would indicate a 4 lug pattern on a circle with a diameter of 3.93 inches (or 100 mm).

The basic embodiment of the present invention teaches a clampless adapter that directly mounts an alignment instrument to the hub of a vehicle wheel through a hand-held mounting plate comprising a cylindrical body having a first end and a second end, the first end being attachable to the alignment instrument and the second end being attachable to the hand-held mounting plate, the hand-held mounting plate having a center hole for attachment of the second end thereto and the plate being connected in a position substantially parallel to the vehicle wheel, the center hole being aligned with the hub of the vehicle wheel. The hand-held tool is designed to contain a connection means to the lug nuts or bolts in the specific pattern of the specific wheel manufactured by a specific auto manufacturer.

The preferred embodiment teaches a hand tool for the alignment of a vehicle wheel comprising a main panel having a first side and a second side. There also includes a first extension extending from the first side of the main panel in a substantially perpendicular orientation and a second extension extending from the first side of the main panel in a substantially perpendicular orientation and oriented toward the first extension to correspond to known bolt patterns on vehicle wheels. There is a hollowed out center on each extension to receive a securing bolt from an aperture on the second side of the main panel. There is a means to tighten the securing bolts, such as a turning handle located on the securing bolts. There is a cylindrical hollowed out body attached to the second side of the main panel extending in a substantially perpendicular orientation and a securing means on the cylindrical hollowed out body to secure an alignment instrument thereon.

The above embodiment can be further modified by defining that there includes a cut out portion of the main panel to act as a handle.

The above embodiment can be further modified by defining that there includes two or more apertures in the main panel to correspond to predetermined bolt patterns.

An alternative embodiment teaches a system for aligning a vehicle wheel comprising the steps of first removing two lug nuts or lug bolts from a wheel, then placing a hand tool up against the wheel. The hand tool comprises a main panel having a first side and a second side. There also includes a first extension extending from the first side of the main panel in a substantially perpendicular orientation and a second extension extending from the first side of the main panel in a substantially perpendicular orientation and oriented toward the first extension to correspond to known bolt patterns on vehicle wheels. There is a hollowed out center on each extension to receive a securing bolt from an aperture on the second side of the main panel. There is a means to tighten the securing bolts, such as a turning handle located on the securing bolts. There is a cylindrical hollowed out body attached to the second side of the main panel extending in a substantially perpendicular orientation and a securing means on the cylindrical hollowed out body to secure an alignment instrument thereon. The there is placed two securing bolts through the hollowed out centers of the extensions wherein the extensions line up with the previously removed lug nuts or bolts. The securing bolts are tightened a tightening means, such as handles on the bolts. An alignment instrument is then slid through the cylindrical hollowed out body and secured to the wheel therethrough and secured with a securing means. The wheel is then aligned using the alignment instrument.

The above embodiment can be further modified by defining that there includes a cut out portion of said main panel to act as a handle.

The above embodiment can be further modified by defining that there includes two or more apertures in said main panel to correspond to predetermined bolt patterns.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
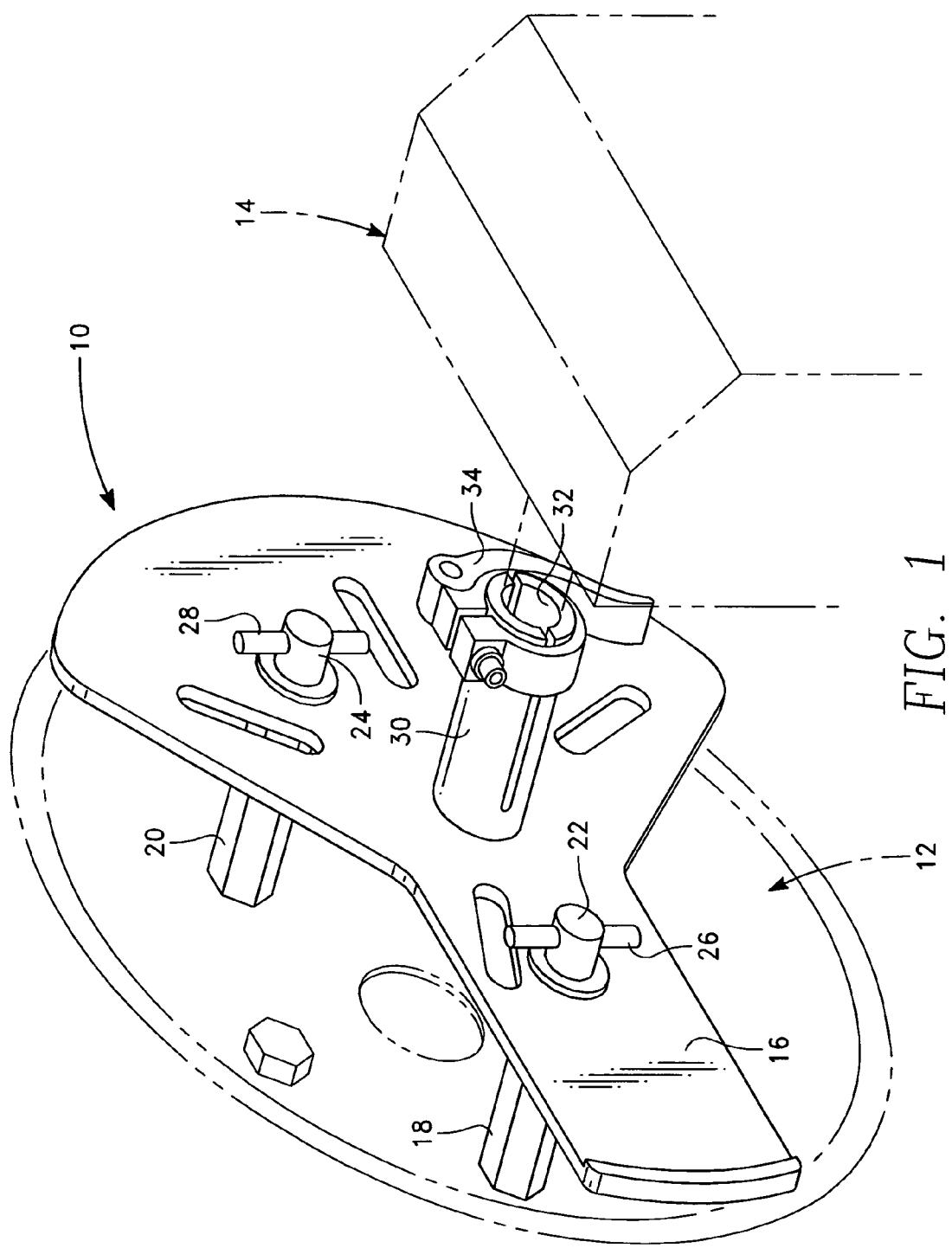
FIG. 1 is a front perspective view of the device.

Turning to the drawings, the preferred embodiment is illustrated and described by reference characters that denote similar elements throughout the several views of the instant invention.

In FIG. 1, we see the hand-held tool 10 of the instant invention in perspective view as it attaches to a wheel 12 on one side and to an alignment instrument 14 on the opposite side. The tool 10 has a handle portion 16 for easy maneuvering. On the side that attaches to the wheel 12 are two pre-fabricated sheaths 18, 20 that are pre-positioned relative to each other to correspond with specific bolt patterns to attach to lug nuts or lug bolts, depending upon the pattern and lug style of the manufacturer of the wheel. As shown in FIG. 1, these sheaths 18, 20 are hexagonal in shape, but can be round or have any other shape depending upon the need for the specific wheel design and lug nut/bolt pattern.

On the opposite side of the device 10 are seen two bolts 22, 24 that are placed inside of the sheaths 18, 20 for attachment to the wheel 12. Each bolt 22, 24 also has a handle 26, 28 to allow for easy screwing in of the bolts 22, 24 onto the wheel 12. On this side of the tool 10 is also found the receptacle 30 for the alignment instrument 14. In use, the alignment instrument 14 slides into the center cavity 32 of the receptacle 30. Once inserted in the center cavity 32 of the receptacle 30, the alignment head 14 is secured in place with a tightening device 34.

Figure 2:
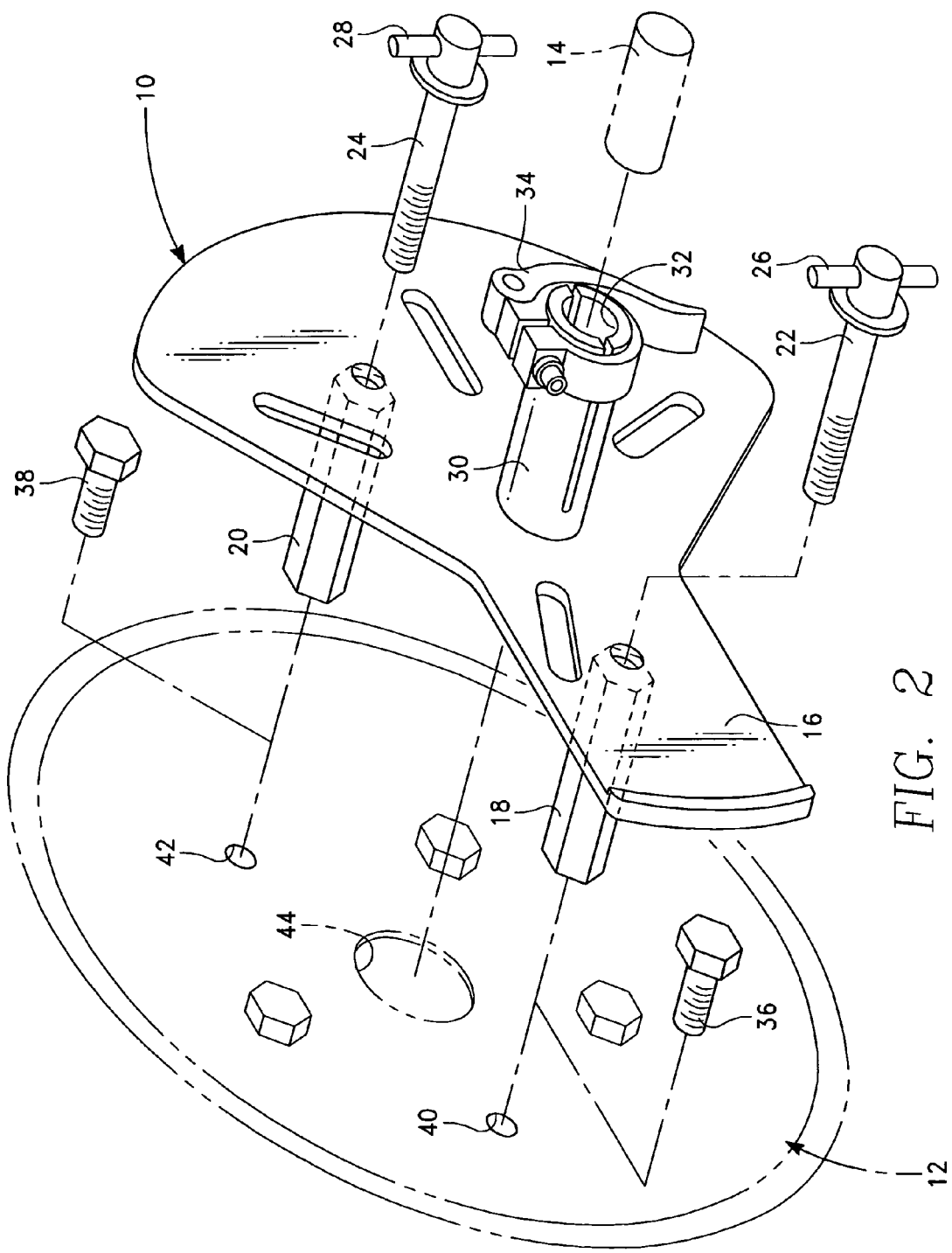
FIG. 2 is an exploded front perspective view of the device.

In FIG. 2, the entire system is seen in an exploded view. In this embodiment the system is used for lug bolt style wheels, such as those manufactured by AUDI® and MERCEDES®. As seen in FIG. 2, the designated lug bolt pattern is a 5 on 112 and uses hexagonal sheaths 18, 20. The sheaths 18, 20 are pre-fabricated through welding, machining, forging, casting and the like. This pre-fabrication is what allows for the ease of the system to work and provides for improved accuracy.

To use, the lug bolts 36, 38 are removed from the holes 40, 42 on the wheel 12. The tool 10 is then placed up against the wheel 12 with sheaths 18, 20 lining up with the holes 40, 42 where the lug bolts 36, 38 were previously secured. The receptacle 30 is lined up with the center hole 44 in the wheel 12. The attachment bolts 22, 24 are then placed through the sheaths 18, 20 and screwed into the holes 40, 42 previously occupied by the lug bolts 36, 38 using the handles 26, 28 on the outer ends of the bolts 22, 24. The alignment head 14 is then slid onto the receiver 30 and secured with the tightening device 34. No clamping to the wheel itself is required. Because designated bolt patterns are used, the alignment head 14 can be attached quicker than when using clamps and the attachment is more accurate.

Figure 3:
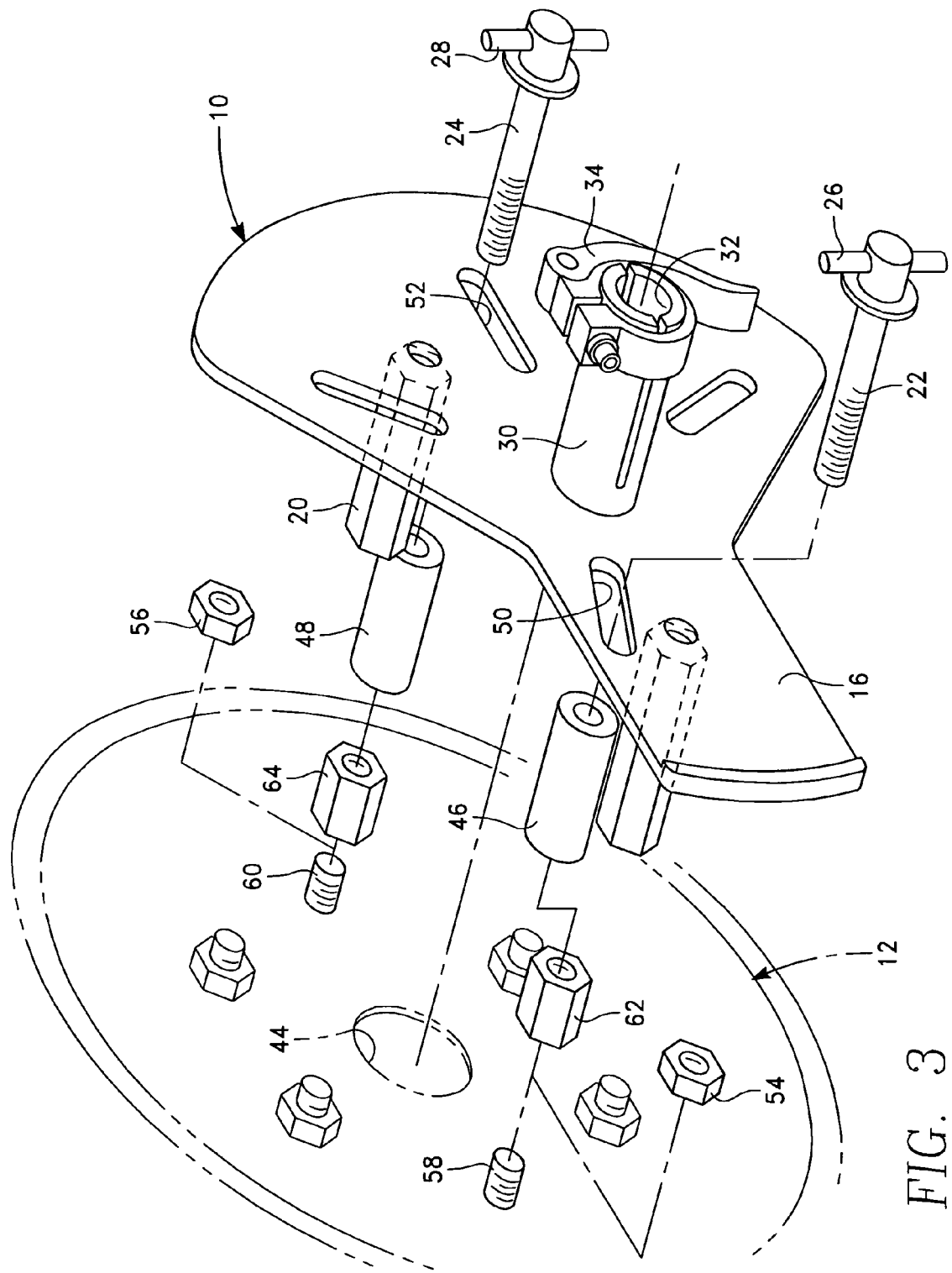
FIG. 3 is an exploded front perspective view as in FIG. 2, but with the inclusion of a threaded spacer.

In FIG. 3, a second embodiment is shown where the type of wheel being serviced uses lug nuts rather than lug bolts. In this embodiment, a pair of spacers 46, 48 can be used and placed through the slots 50, 52 found on the tool 10. These spacers 46, 48 are threaded to allow for easy use with lug nut style wheels. As shown in this figure, the lug nuts 54, 56 are removed leaving two bolts 58, 60 on the wheel 12. When the bolts are what is present, the pre-fabricated sheaths 18, may or may not be used. In the case where the pre-fabricated sheaths 18, 20 are used or when additional spacers 46, 48 are used, there still needs to be a pair of adapters 62, 64 added to allow for the screwing on of the securing bolts 22, 24 to the wheel 12. As can be seen in this figure, the sheaths 18, 20 can be hexagonal or the spacers added 46, 48 can be round and vice versa, or any other shape dictated by the manufacturer of the wheel 12.

Figure 4:
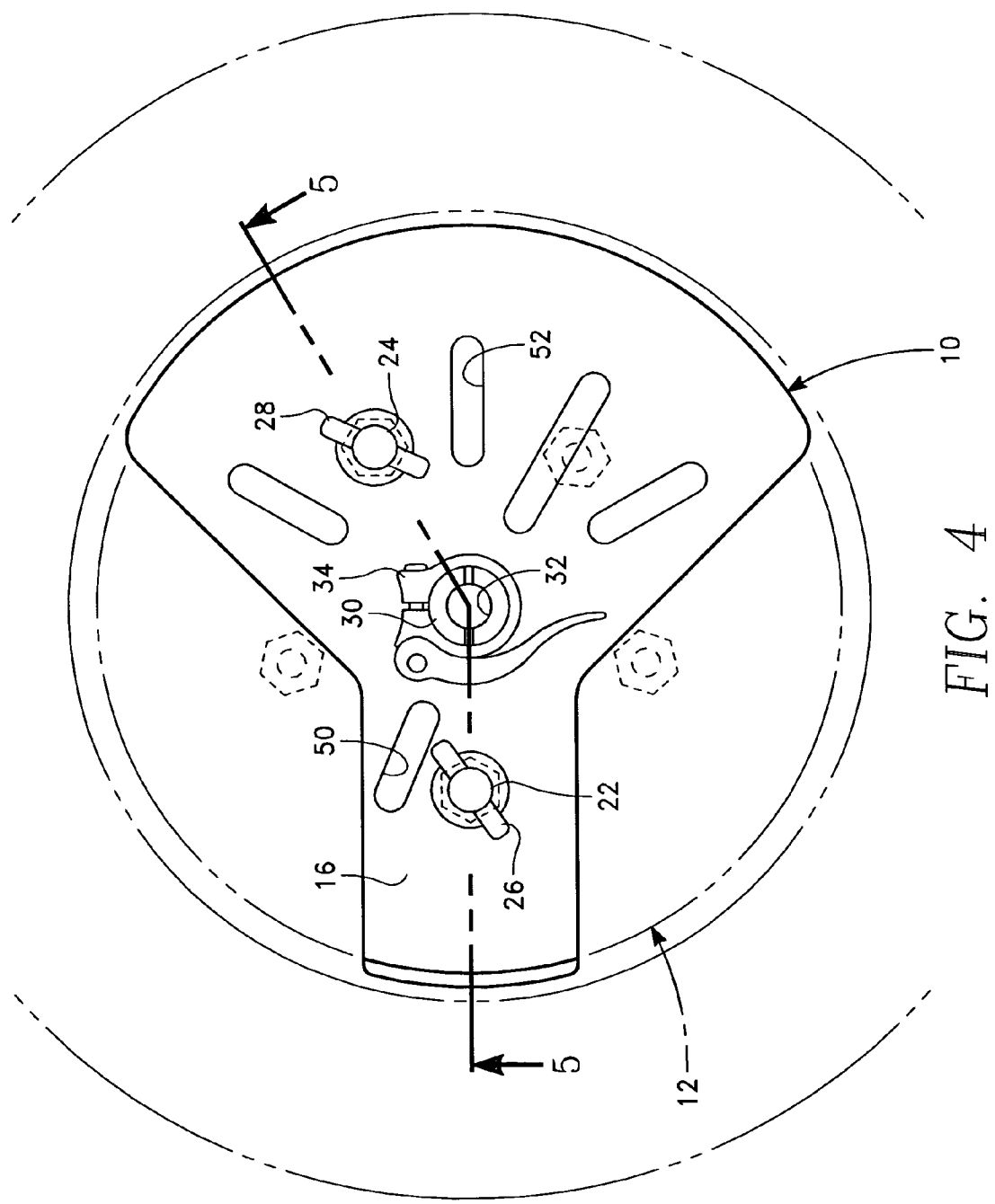
FIG. 4 is a front view of the device as it attaches to a wheel.
Figure 5:
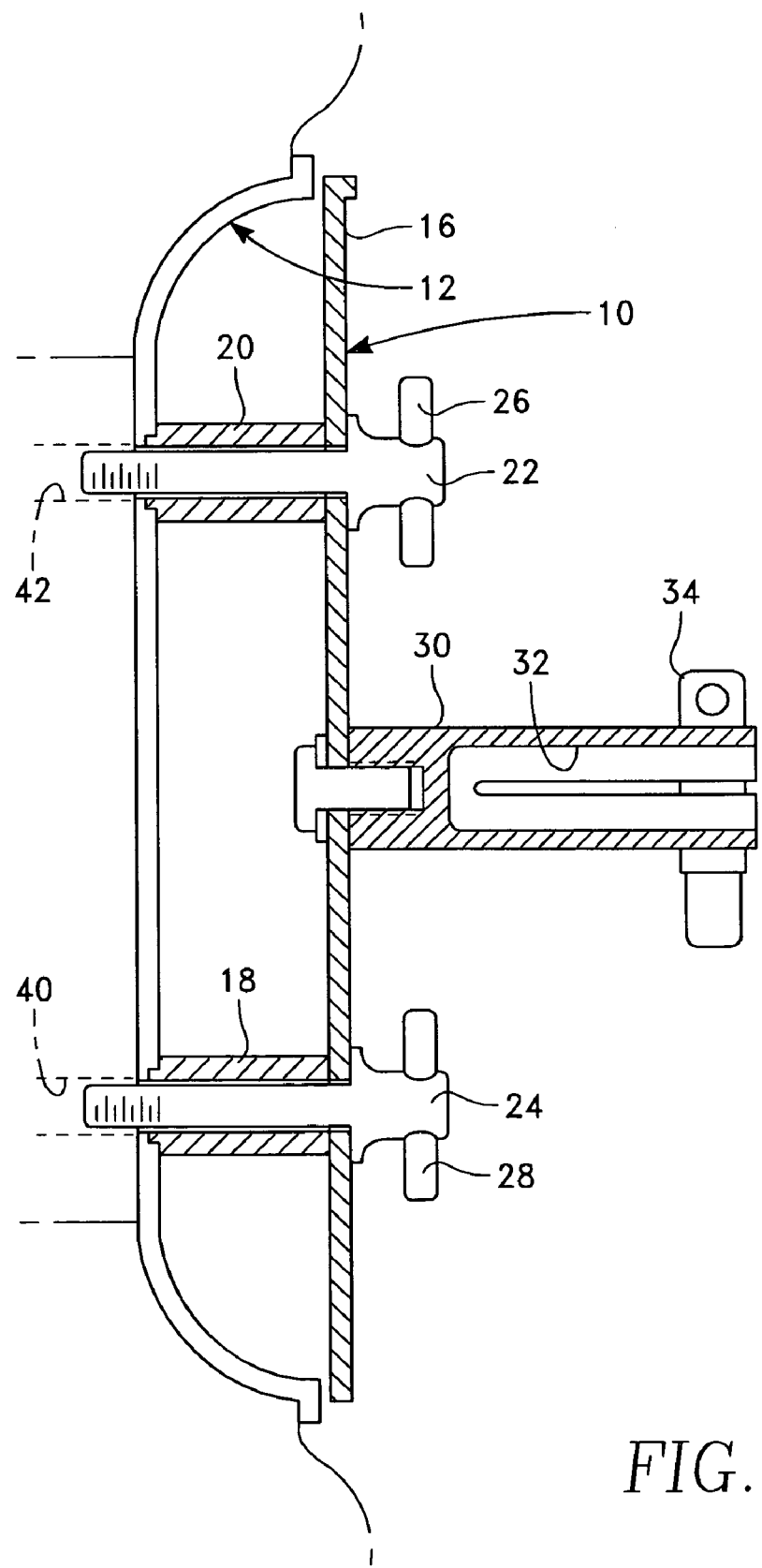
FIG. 5 is taken along the line 5-5 in FIG. 4.
Figure 6:
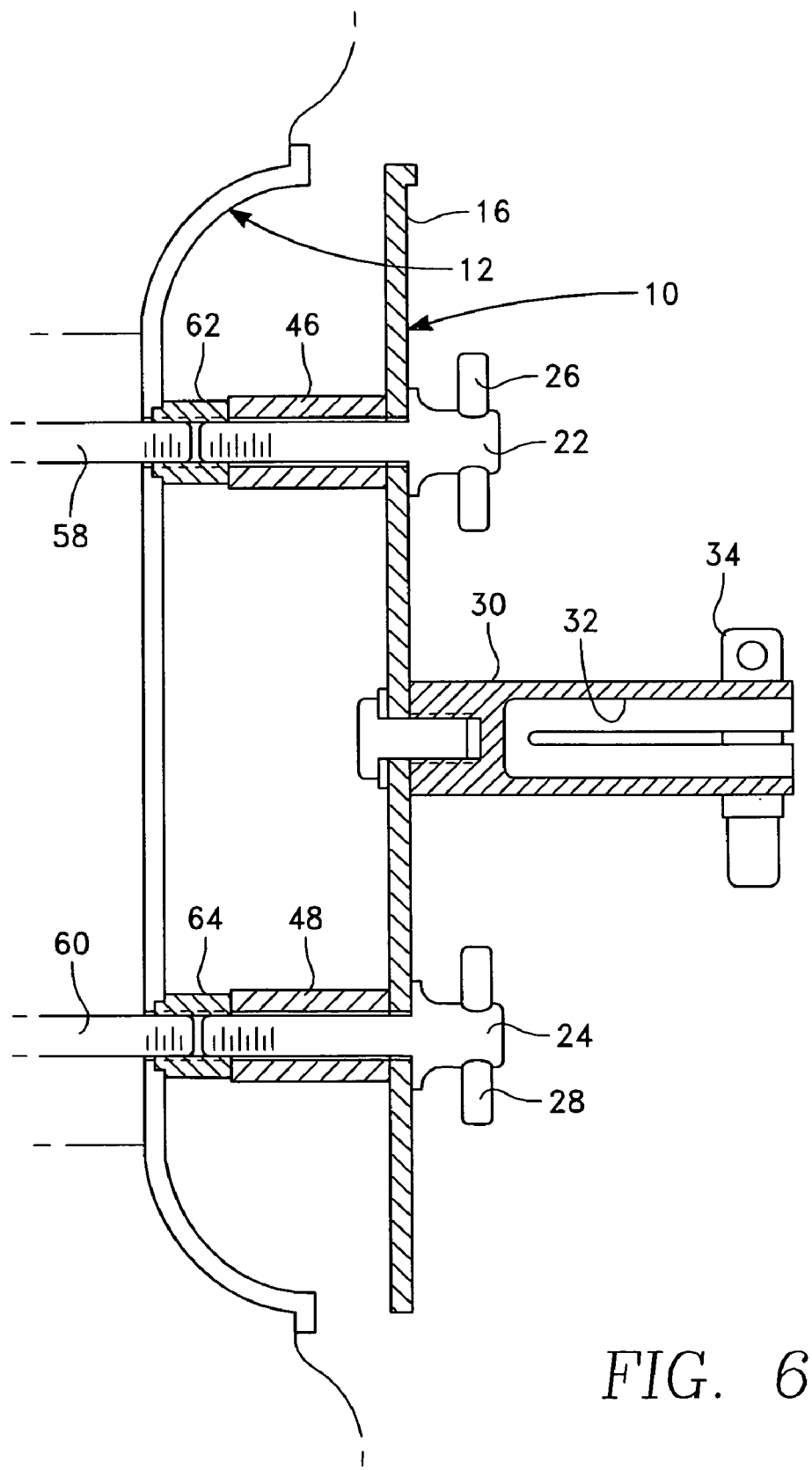
FIG. 6 is taken along the line 5-5 in FIG. 4 but with the inclusion of the threaded spacer as in FIG. 2.

FIG. 4 shows a view of the entire device 10 attached to the wheel 12 looking at the wheel 12 straight on. No clamping of the device 10 to the wheel is needed. FIG. 5 shows a cross-section view demonstrating how the securing bolts 22 and 24 go through the plate 10 into the wheel 12. FIG. 6 is the same view as FIG. 5, but with the inclusion of the threaded spacers 46, 48 when using lug nut style wheels.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A hand tool for the alignment of a vehicle wheel comprising:
    a main panel, said main panel having a first side and a second side;
    a first extension extending from said first side of said main panel in a substantially perpendicular orientation;
    a second extension extending from said first side of said main panel in a substantially perpendicular orientation and oriented toward said first extension to correspond to known bolt patterns on vehicle wheels;
    a first hollowed out center on said first extension to receive a first securing bolt from a first aperture on said second side of said main panel;
    a second hollowed out center on said second extension to receive a second securing bolt from a second aperture on said second side of said main panel;
    means to tighten said first and second securing bolts, such as a turning handle located on said first and second securing bolts;
    a cylindrical hollowed out body attached to said second side of said main panel extending in a substantially perpendicular orientation; and
    securing means on said cylindrical hollowed out body to secure an alignment instrument thereon.

2. The hand tool as defined in claim 1 wherein there includes a cut out portion of said main panel to act as a handle.

3. The hand tool as defined in claim 1 wherein there includes two or more apertures in said main panel to correspond to predetermined bolt patterns.

4. A system for aligning a vehicle wheel comprising the steps of
    removing two lug nuts or lug bolts from a wheel;
    placing a hand tool up against said wheel, said hand tool comprising
        a main panel, said main panel having a first side and a second side;
        a first extension extending from said first side of said main panel in a substantially perpendicular orientation;
        a second extension extending from said first side of said main panel in a substantially perpendicular orientation and oriented toward said first extension to correspond to known bolt patterns on vehicle wheels;
        a first hollowed out center on said first extension to receive a first securing bolt from a first aperture on said second side of said main panel;
        a second hollowed out center on said second extension to receive a second securing bolt from a second aperture on said second side of said main panel;
        means to tighten said first and second securing bolts, such as a turning handle located on said first and second securing bolts;
        a cylindrical hollowed out body attached to said second side of said main panel extending in a substantially perpendicular orientation; and
        securing means on said cylindrical hollowed out body to secure an alignment instrument thereon
    placement of said first and second securing bolts through said first and second hollowed out centers of said first and second extensions wherein said first and second extensions line up with said previously removed lug nuts or bolts;
    tightening said first and second securing bolts with said tightening means;
    sliding alignment instrument through said cylindrical hollowed out body;
    securing said alignment instrument to said wheel through said securing means; and
    aligning said wheel with said alignment instrument.

5. The system as defined in claim 4 wherein there includes a cut out portion of said main panel to act as a handle.

6. The system as defined in claim 4 wherein there includes two or more apertures in said main panel to correspond to predetermined bolt patterns.

* * * * *